United States Patent
Nguyen et al.

(10) Patent No.: US 6,607,175 B1
(45) Date of Patent: Aug. 19, 2003

(54) MEDIA CONTROL VALVE

(75) Inventors: Phuong T. Nguyen, Richmond, TX (US); Robert E. Thompson, Sugarland, TX (US); Joshua J. Kimmel, Houston, TX (US)

(73) Assignee: United States Filter Corporation, Palm Desert, CA (US)

(*) Notice: Subject to any disclaimer, the term of this patent is extended or adjusted under 35 U.S.C. 154(b) by 0 days.

(21) Appl. No.: 09/709,894

(22) Filed: Nov. 10, 2000

(51) Int. Cl.⁷ .......................... F16K 34/143; B24C 7/00
(52) U.S. Cl. .................. 251/63.5; 251/60; 251/205; 137/553; 451/101
(58) Field of Search .................. 251/60, 63.5, 205; 137/553, 872, 881, 885; 451/101

(56) References Cited

U.S. PATENT DOCUMENTS

| | | | |
|---|---|---|---|
| 671,303 A | 4/1901 | Warren | 302/53 |
| 1,283,907 A * | 11/1918 | Rigby | 251/205 X |
| 1,586,844 A * | 6/1926 | Rigby | 251/205 X |
| 1,646,048 A * | 10/1927 | Wirz | 251/205 X |
| 1,850,850 A * | 3/1932 | Peterson | 251/205 |
| 1,898,354 A | 2/1933 | Fickey | 302/53 |
| 2,032,367 A | 3/1936 | Kennedy et al. | 302/53 |
| RE21,275 E | 11/1939 | Pletcher | 51/11 |
| 2,200,587 A | 5/1940 | Tirrell | 51/8 |
| 2,684,872 A | 7/1954 | Berg | 302/53 |
| 2,705,829 A * | 4/1955 | Mock | 251/205 X |
| 2,764,995 A * | 10/1956 | Krupp et al. | 251/205 X |
| 2,994,344 A | 8/1961 | Kerley | 137/556 |
| 3,010,695 A * | 11/1961 | Banks | 251/205 |
| 3,074,600 A | 1/1963 | Warhurst | 222/193 |
| 3,092,133 A | 6/1963 | Clark | 137/220 |
| 3,201,901 A | 8/1965 | Pauli | 51/12 |
| 3,476,440 A | 11/1969 | Schmidt et al. | 302/53 |
| 3,512,550 A * | 5/1970 | Ammann | 251/60 X |
| 3,573,200 A | 3/1971 | Vogel | 208/173 |
| 3,737,140 A * | 6/1973 | Toth | 251/63.5 X |
| 3,793,778 A | 2/1974 | Price | 51/12 |
| 3,802,462 A * | 4/1974 | Trosch | 251/60 X |
| 4,075,789 A | 2/1978 | Dremann | 51/436 |

(List continued on next page.)

FOREIGN PATENT DOCUMENTS

| | | |
|---|---|---|
| DE | 1235093 | 2/1967 |
| DE | 3019119 | 11/1981 |
| EP | 0 810 038 A2 | 12/1997 |
| FR | 1 558 037 A | 2/1969 |
| GB | 1 134 363 A | 11/1968 |
| GB | 1216701 | 12/1970 |

*Primary Examiner*—John Rivell
(74) *Attorney, Agent, or Firm*—Wolf, Greenfield & Sacks, P.C.

(57) ABSTRACT

The present invention is related to valves for the controlling the flow of media. For example, the valves of the present invention may control the flow of solid media into a fluid stream. More, specifically, the valves of the present invention may be used to control the flow of a blasting media into an air stream as part of a blasting apparatus for treatment of a surface. In one embodiment, the media control valve of the present invention includes a valve body having a media inlet and a media outlet. A housing is connected to the valve body. A plunger is positioned within the valve body and is connected to a piston positioned within the housing. A base is connected to the valve body such that it communicates with the media outlet. The media control valve of this embodiment may further include a sleeve disposed between the valve body and the plunger. This sleeve may contain a media opening. In some embodiments of the media control valve of the present invention, the media opening has a first portion proximate to the media outlet and a second portion distal to the media outlet, the second portion being broader than the first portion. In other embodiments of the invention, the piston includes a contaminant isolation region.

26 Claims, 7 Drawing Sheets

U.S. PATENT DOCUMENTS

| | | | |
|---|---|---|---|
| 4,088,064 A | * 5/1978 | Tsunemoto et al. | 251/60 X |
| 4,169,405 A | * 10/1979 | Tsunemoto et al. | 251/60 X |
| 4,180,239 A | * 12/1979 | Valukis | 251/60 |
| 4,335,744 A | * 6/1982 | Bey | 251/63.5 X |
| 4,387,020 A | 6/1983 | Hill | 210/86 |
| 4,406,180 A | 9/1983 | Naumec | 74/822 |
| 4,414,882 A | 11/1983 | Frei | 91/442 |
| 4,522,373 A | 6/1985 | Shelbourn et al. | 251/297 |
| 4,534,139 A | 8/1985 | Desjardins | 51/438 |
| 4,634,099 A | 1/1987 | Danko et al. | 251/335.3 |
| 4,662,603 A | 5/1987 | Etheridge | 251/63.5 |
| 4,687,017 A | 8/1987 | Danko et al. | 137/315 |
| 4,735,021 A | 4/1988 | Smith | 51/438 |
| 4,815,692 A | 3/1989 | Loiseau et al. | 251/14 |
| 4,909,277 A | 3/1990 | Vandiver | 137/493.7 |
| 4,995,589 A | 2/1991 | Adishian et al. | 251/335.5 |
| 5,081,799 A | 1/1992 | Kirschner et al. | 51/410 |
| 5,083,402 A | 1/1992 | Kirschner et al. | 51/319 |
| 5,097,633 A | 3/1992 | Branton et al. | 51/165.71 |
| 5,101,847 A | 4/1992 | Oribe | 137/1 |
| 5,215,286 A | 6/1993 | Kolenc | 251/58 |
| 5,230,185 A | 7/1993 | Kirschner et al. | 51/410 |
| 5,283,990 A | 2/1994 | Shank, Jr. | 51/427 |
| 5,401,205 A | 3/1995 | Shank, Jr. | 451/101 |
| 5,407,379 A | 4/1995 | Shank et al. | 451/99 |
| 5,421,767 A | * 6/1995 | Spears, Jr. et al. | 451/101 |
| 5,542,873 A | * 8/1996 | Shank, Jr. | 451/101 X |
| 5,810,045 A | 9/1998 | Evans | 137/312 |

* cited by examiner

MEDIA CONTROL VALVE

BACKGROUND

1. Field of the Invention

The present invention is related to media control and, more specifically, media control valves used to control the flow of a media into a fluid stream as part of an apparatus for treatment of a surface.

2. Description of the Related Art

A typical media control valve is disclosed in U.S. Pat. No. 3,476,440 ("the '440 patent"), which is hereby incorporated by reference in its entirety. The valve of the '440 patent is attached to a media vessel and controls the flow of the media from the media vessel into a conduit containing a fluid stream. This conduit terminates in a nozzle. Fluid and media pass through the nozzle at high speed and are typically used to treat surfaces.

Other uses for media control valves have been proposed. For example, U.S. Pat. No. 5,810,045 ("the '045 patent") discloses a valve for introducing particulate materials into a high-pressure air stream and suggests several uses for this valve. For example, the '045 patent suggests that the valve may be used for purposes such as introducing fluid catalytic cracking catalyst particles into fluid catalytic cracking units used to crack and reform various petroleum based products, introducing particulate catalysts into other kinds of chemical processes and spraying particulate ingredients on adhesive substrates as part of various manufacturing processes.

Various improvements to the basic media control valve have been proposed. For example, U.S. Pat. No. 5,407,379 ("the '379 patent") and U.S. Pat. No. 5,401,205 ("the '205 patent") disclose a media control valve having a media passage between the media control valve and the conduit. The media passage converges into a slot-shaped outlet in the conduit so as to reduce the perimeter of the outlet placed perpendicular to air flow and consequently reduce turbulence as air passes across the outlet. The media control valve disclosed in the '205 and '379 patents is particularly useful in metering and dispensing sodium bicarbonate media.

The '045 patent, discussed previously, also discloses a modification of the original media control valve, including the use of multiple seals around a plunger of the valve with an exhaust therebetween to remove any contaminants that breach the seals.

SUMMARY

According to one embodiment of the present invention, a media control valve is provided including a valve body having a media inlet and a media outlet, and a plunger and sleeve positioned within the valve body. The media control valve also includes a media opening in the sleeve having a first portion proximate to the media outlet and a second portion distal to the media outlet, wherein the second portion is broader than the first portion. The media control valve further includes a housing connected to the valve body, a piston positioned within the housing and connected to the plunger, and a base connected to the valve body in communication with the media outlet.

According to another embodiment of the present invention, a valve is provided including a body having an opening and an outlet. The opening in the outlet includes a first portion proximate to the outlet and a second portion distal to the outlet, wherein the second portion is broader than the first portion. The valve further includes a closing member positioned within the body so as to selectively cover the opening.

According to another embodiment of the present invention, a valve is provided including a body and a closing member positioned within the body. The valve also includes a housing and a piston within the housing. The piston is connected to the closing member and has a contaminant isolation region.

According to another embodiment of the present invention, a media control valve is provided including a valve body having a media inlet and a media outlet, and a plunger and sleeve positioned within the valve body. The media control valve also includes a media opening in the sleeve, a housing connected to the valve body, a piston having a contaminant isolation region positioned within the housing and connected to the plunger and a base connected to the valve body in communication with the media outlet.

BRIEF DESCRIPTION OF DRAWINGS

The foregoing and other advantages of the present invention will be more fully appreciated with reference to the following drawings in which.

DETAILED DESCRIPTION

The present invention is directed to a valve for controlling the flow of a media to a fluid stream, referred to herein as a media control valve. By media, it is meant any material or materials that may be desired to be added to another material or materials. While various solid, fine particulate, blasting media, such as sand, metal shot, and the like, are used by way of example herein, the media that may be supplied by the media control valve of the present invention is not so limited, and may include a wide variety of materials including liquids and gasses as well as solid particles.

In one embodiment, the media control valve of the present invention includes a valve body having a media inlet and a media outlet. A housing is connected to the valve body. A plunger is positioned within the valve body and is connected to a piston positioned within the housing. A base is connected to the valve body such that it communicates with the media outlet. The media control valve of this embodiment may further include a sleeve disposed between the valve body and the plunger. This sleeve may contain a media opening. In some embodiments of the media control valve of the present invention, the media opening has a first portion proximate to the media outlet and a second portion distal to the media outlet, the second portion being broader than the first portion. In other embodiments of the invention, the piston includes a contaminant isolation region. These and other specific embodiments of the invention will now be described with reference to the Figures.

Figure 1:
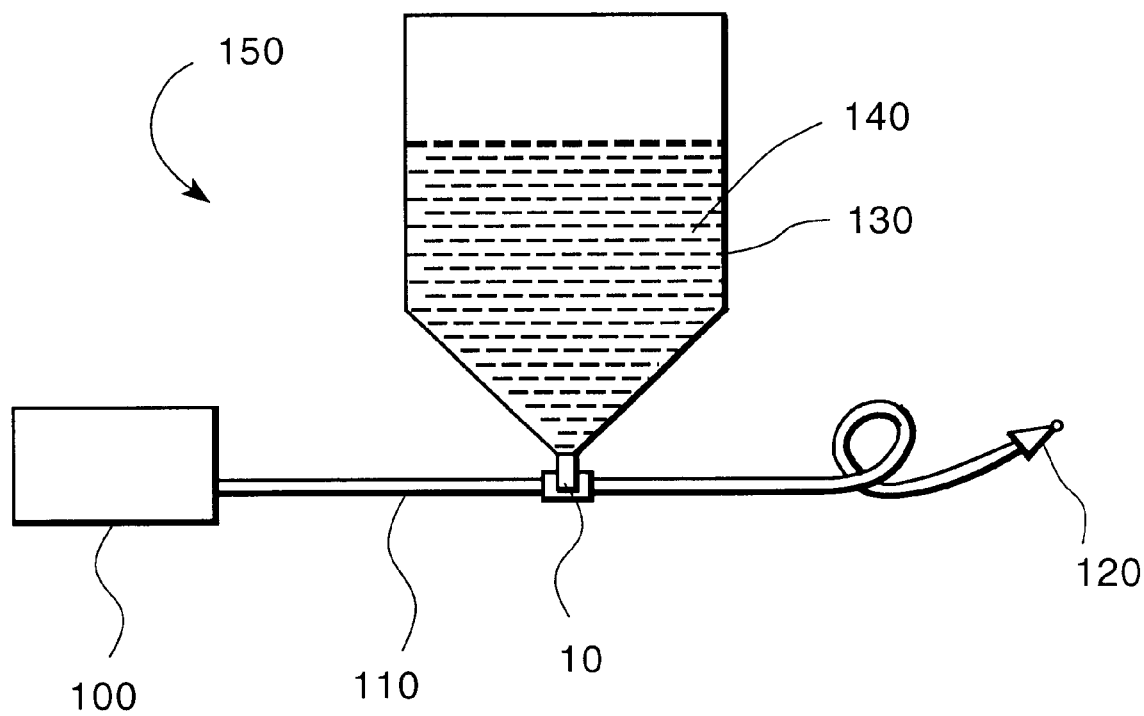
FIG. 1 is a diagram of a blasting system incorporating the media control valve of the present invention.

FIG. 1 illustrates a typical system in which the media control valve of the present invention may be employed. In FIG. 1, a media control valve 10 is part of a blast system 150 used to treat a surface by projecting a media 140 at the surface. Media 140 typically consists of solid particles, such as sand, shot, nut shells, sodium bicarbonate, other abrasives, and the like depending on the surface being treated and the materials(s) being removed from the surface. Blast system 150 includes a fluid supply 100 which supplies a fluid stream through conduit 110. Typically, the fluid employed is air, though any readily available, relatively inert carrier fluid may be employed. Media 140 may be stored in a media vessel 130 and supplied to the fluid stream within conduit 110 through actuation of media control valve 10. The fluid stream and entrained media 140 then pass through conduit 110 to a nozzle 120 where they are directed at a surface to be treated.

Figure 2:
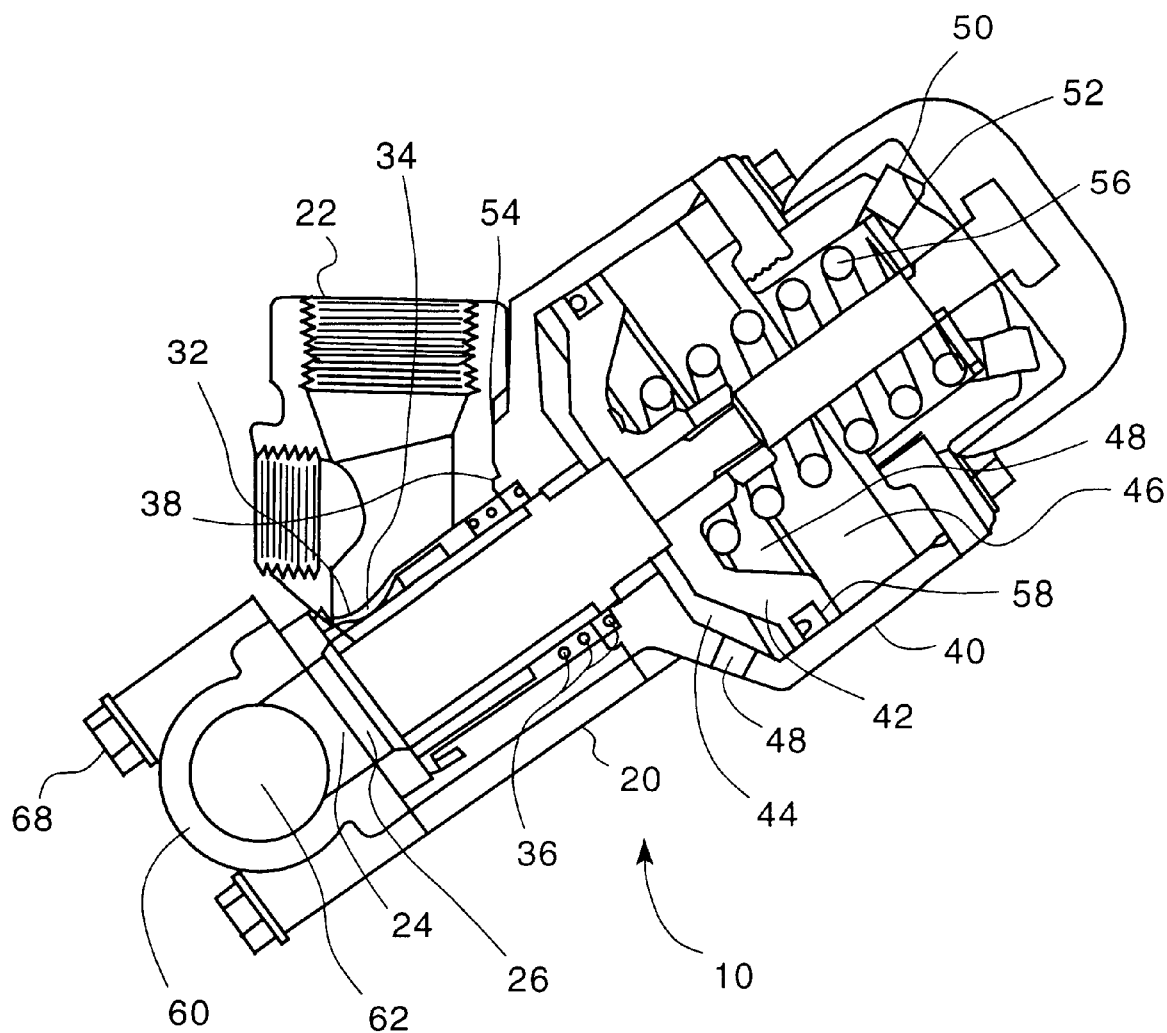
FIG. 2 is a cross-sectional side view of a media control valve according to an aspect of the present invention.
Figure 3:
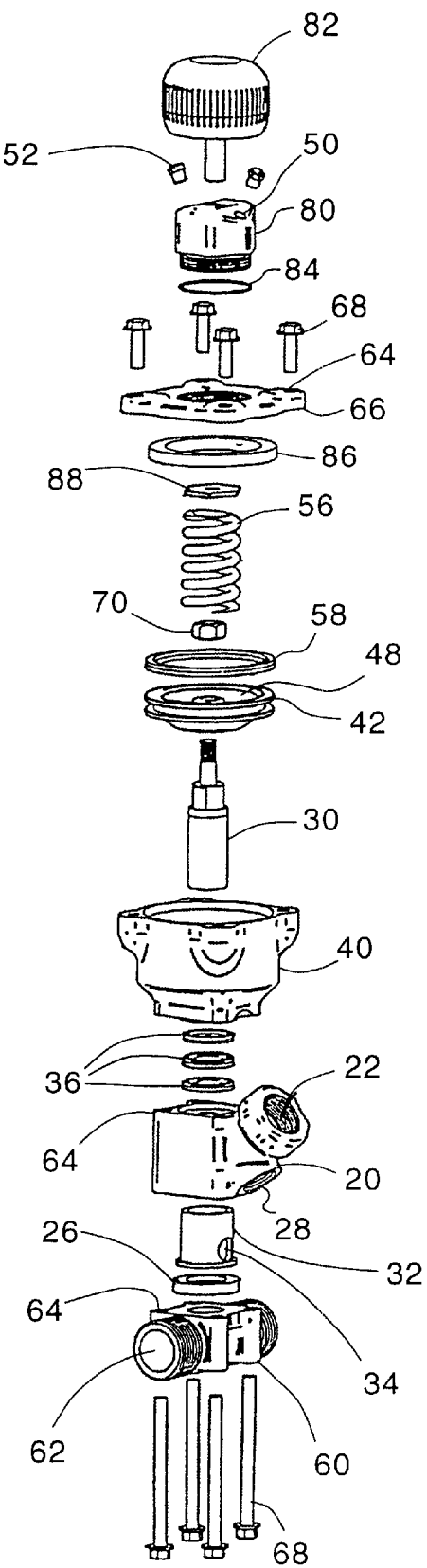
FIG. 3 is an exploded, elevational view of the valve shown in FIG. 2.

Referring now to FIGS. 2 and 3, in one embodiment media control valve 10 may include a valve body 20 having a media inlet 22 and a media outlet 24. A plunger 30 is positioned within valve body 20 and a sleeve 32 is positioned between valve body 20 and plunger 30. Sleeve 32 may include a media opening 34 that allows media to pass from media inlet 22 to media outlet 24 when plunger 30 is not blocking such flow. In this embodiment, media control valve 10 further includes a housing 40 that is connected to valve body 20. A piston 42 is connected to plunger 30 and positioned within housing 40. A base 60 is connected to valve body 20 such that it communicates with media outlet 24.

Valve body 20 may be constructed in any manner and of any materials that provide valve body 20 the desired configuration and durability. For example, valve body 20 may be constructed with media inlet 22. Media inlet 22 may be constructed in any manner that allows it to receive media. For example, media inlet 22 may be constructed to connect to a media vessel. When media inlet 22 is constructed to connect with a media vessel, it may be constructed to connect in any manner that provides a secure connection and allows media to flow into valve body 20 from the media vessel. For example, media inlet 22 may be threaded, or otherwise provided with a fitting such that it may mate with a connector attached to the media vessel.

Valve body 20 may also be constructed with media outlet 24. Media outlet 24 may be constructed in any manner that allows media to pass from valve body 20 into a fluid passage 62 within base 60. For example, media outlet 24 may be an aperture of any size and shape capable of delivering media in an adequate volumetric flow through a conduit, and, most typically, to a blast nozzle. In preferred embodiments, media outlet 24 may be shaped as a circular hole.

Valve body 20 may also be constructed to house plunger 30. Valve body 20 may include an open area having a shape corresponding to plunger 30. Valve body 20 may also be constructed to allow sleeve 32, seals 36 or seat 26 to reside within valve body 20. For example, the opening in valve body 20 for receiving plunger 30 may be large enough to also accommodate sleeve 32 or seals 36 between plunger 30 and valve body 20. Similarly, valve body 20 may include a portion shaped to accommodate seat 26, typically adjacent to media outlet 24.

Valve body 20 may also be constructed with a mechanism for allowing the media to pass out of the media vessel without passing into the conduit. For example, valve body 20 may include a bypass or cleanout 28. Cleanout 28 may be constructed in any manner which allows the media to flow out of the media vessel without entering the conduit. For example, cleanout 28 may include an opening in valve body 20 communicating directly with media inlet 22. Typically, during operation of media control valve 10, cleanout 28 is closed. Cleanout 28 may also include an opening onto which a cover may be mated when it is desired to close cleanout 28.

Valve body 20 may be constructed of any material or materials that have sufficient durability for valve body 20 and are compatible with media and other materials which may come in contact with valve body 20. For example, valve body 20 may be constructed of various metals and metal alloys. Preferably, valve body 20 is constructed of an aluminum alloy because of its relatively low weight and cost and relatively high strength and abrasion resistance. Preferably, the aluminum alloy has a hard-coat anodized finish to improve its abrasion resistance. In one embodiment, valve body 20 is constructed of 356 T6 aluminum alloy with a hard-coat anodized finish.

Valve body 20 may be constructed by any method capable of producing valve 20 from a desired material or materials of construction. For example, where valve body 20 is constructed of certain metals, valve body 20 may be cast, machined or both. Preferably, valve body 20 is constructed by casting, and, more preferably, investment casting, because casting is relatively inexpensive and produces a relatively high quality product having sufficient dimensional stability.

Figure 9:
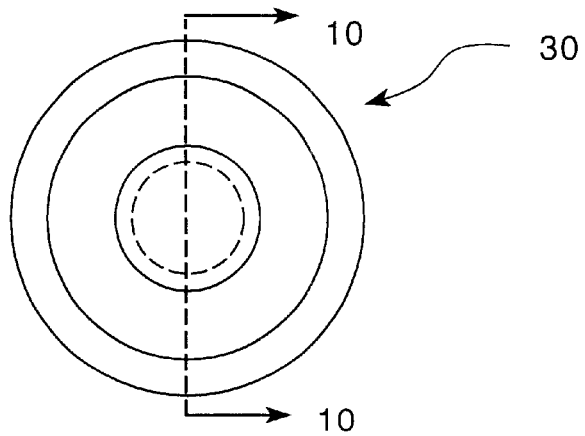
FIG. 9 is a top plan view of a plunger according to one embodiment of the present invention.
Figure 10:
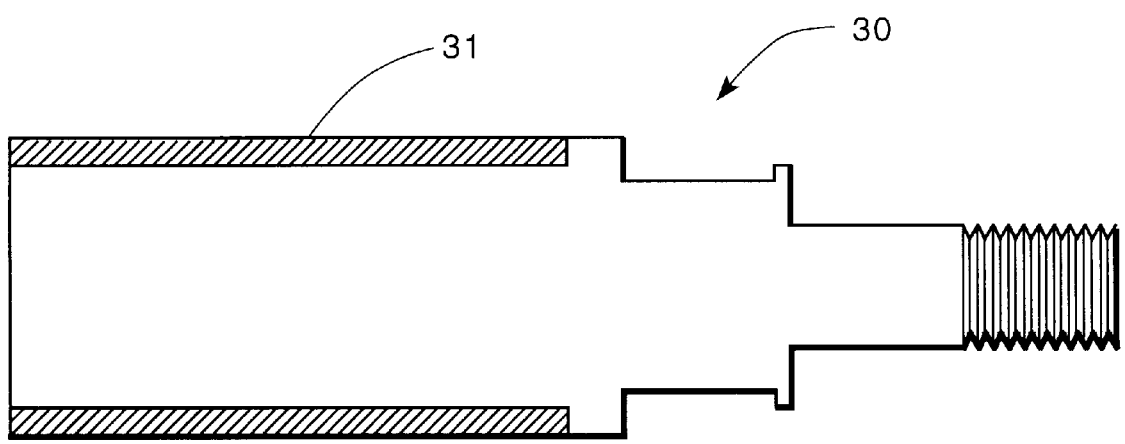
FIG. 10 is a cross-sectional side view of the plunger illustrated in FIG. 9, taken along section line 10—10 of FIG. 9.

Referring now also to FIGS. 9 and 10, plunger 30 may be constructed in any manner and using any materials resulting in plunger 30 having the shape and durability to selectively prevent flow of media through valve body 20. For example, plunger 30 may be constructed in any shape that may mate with valve body 20, sleeve 32 and seals 36 to selectively prevent flow of media from media inlet 22 to media outlet 24. In order to selectively prevent flow of media, plunger 30 is typically constructed such that it may move within valve body 20, selectively exposing a media opening 34 in sleeve 32 and allowing the media to flow from media inlet 22 to media outlet 24. Preferably, plunger 30 is cylindrical and of uniform cross-section.

Plunger 30 may be constructed to mate with piston 42. For example, plunger 30 may be threaded at one end, such that it may be mated to piston 42 with a threaded nut 70. Alternatively, plunger 30 may thread directly into piston 42 or be connected with another connector know to those of skill in the art.

Plunger 30 may be constructed of any material or materials that are sufficiently durable and inert to selectively prevent the passage of media through or past plunger 30 and to provide long life of plunger 30. For example, plunger 30 may be constructed of the same material or materials as valve body 20. However, as plunger 30 may be subject to more wear than valve body 20, it is preferred to construct plunger 30 of a more durable material than valve body 20: For example, plunger 30 may be constructed of steel, such as 304 stainless steel, with harder material, such as tungsten carbide, on the outer, lower portion 31 of plunger 30. These materials are selected due to their relatively high strength and dimensional stability. Plunger 30 may be made by any conventional method to produce the desired shape from the material or materials of construction. For example, plunger 30 may be constructed by the same method as valve body 20.

Figure 4:
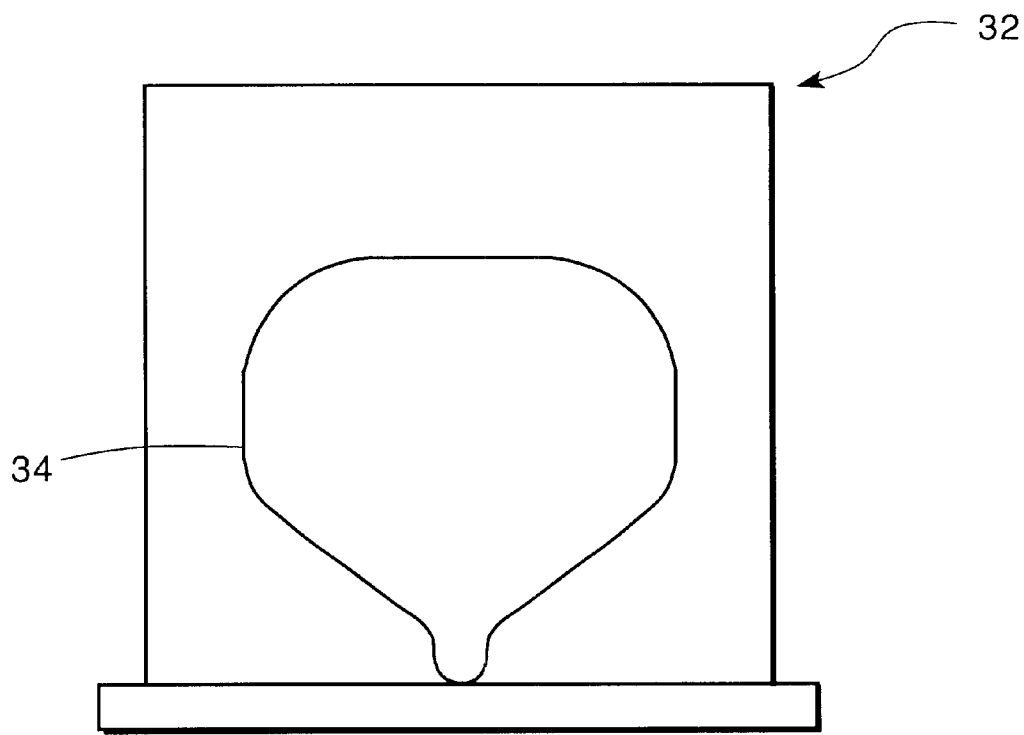
FIG. 4 is a side elevational view of a sleeve according to one embodiment of the present invention.
Figure 5:
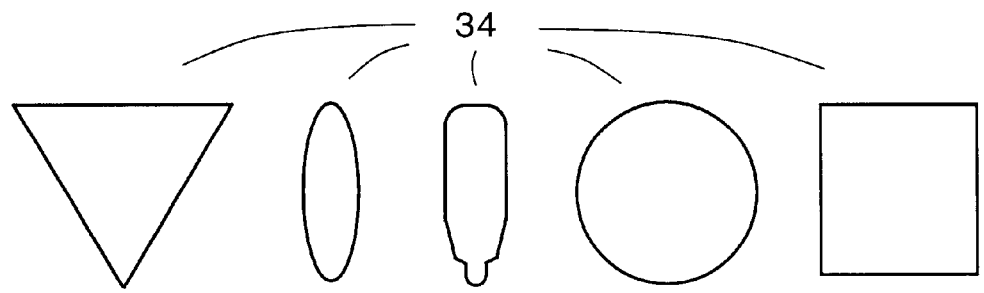
FIG. 5 is an illustration of example embodiments of a media opening according to the present invention.
Figure 6:
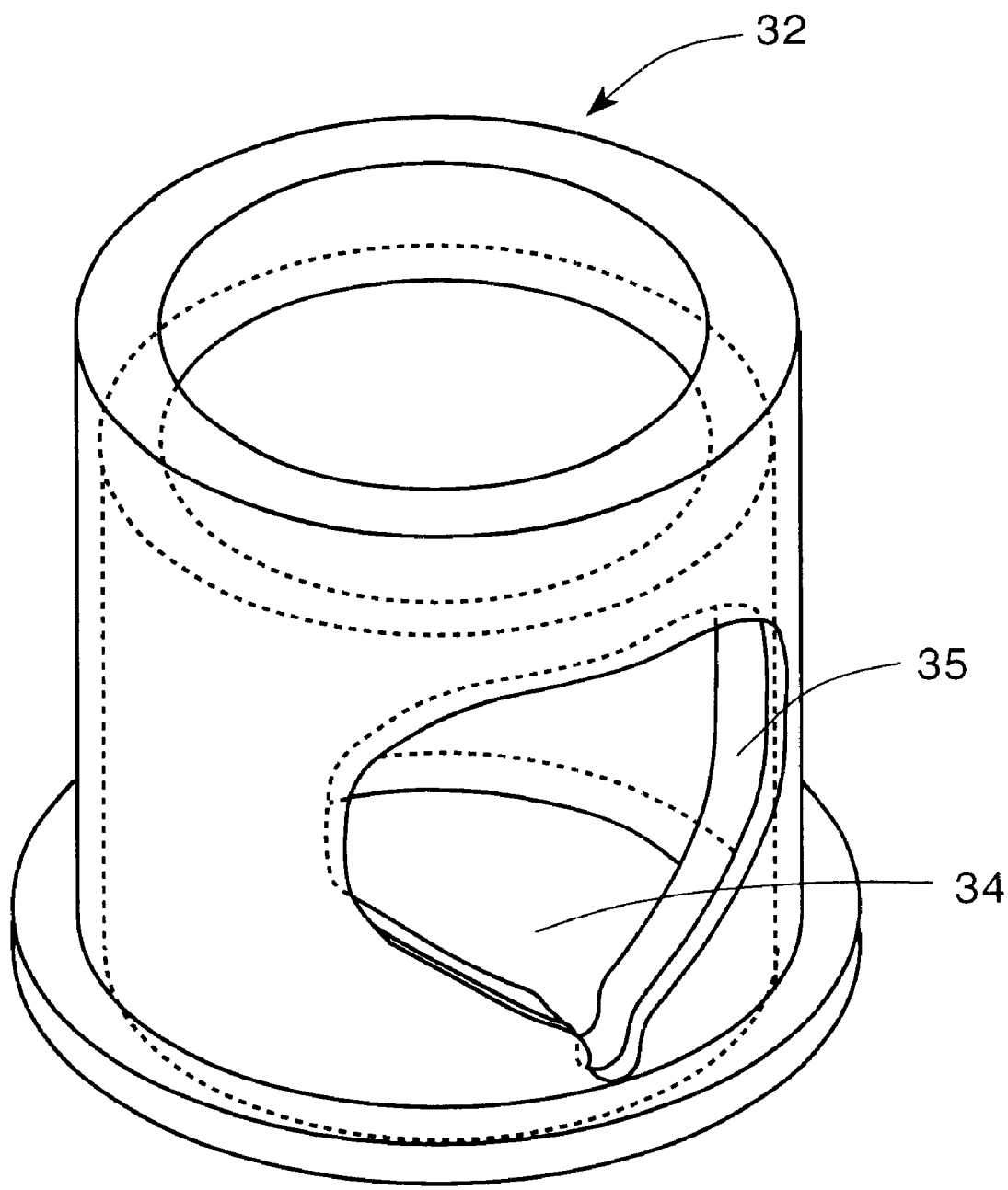
FIG. 6 is a perspective view of the sleeve illustrated in FIG. 4 with phantom lines to show relative thickness.
Figure 7:
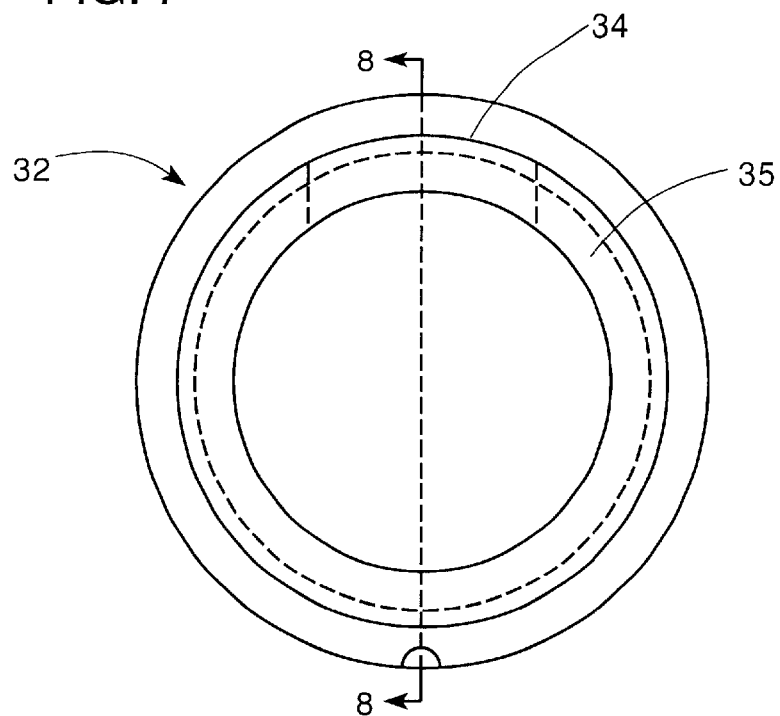
FIG. 7 is a bottom plan view of the sleeve illustrated in FIG. 4 with phantom lines to show relative thickness.
Figure 8:
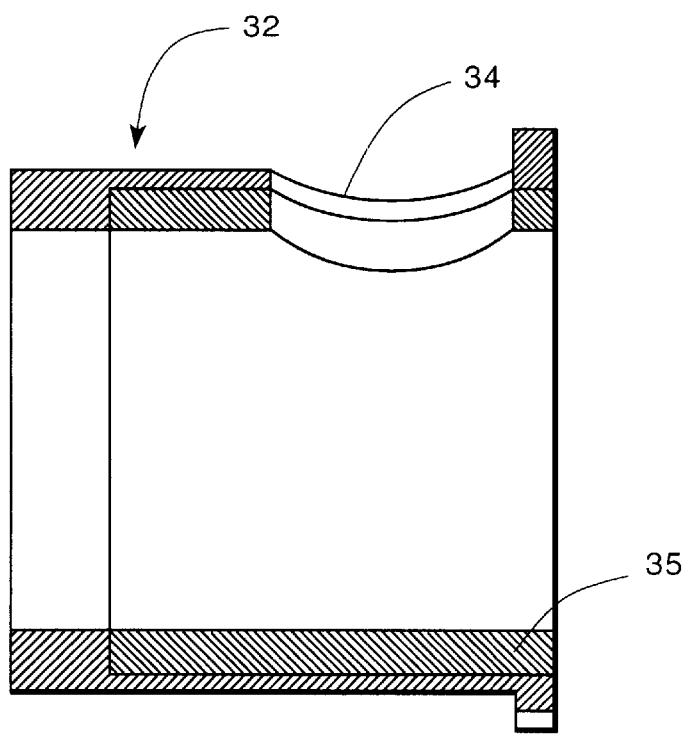
FIG. 8 is a cross-sectional side view of the sleeve illustrated in FIG. 4, taken along section line 8—8 of FIG. 7.

Referring now also to FIGS. 4–8, Sleeve 32 may be constructed in any manner and of any materials to produce a desired configuration to be contained within valve body 20 and to mate with plunger 30. For example, sleeve 32 may be constructed as a cylindrical annulus where plunger 30 is cylindrical and valve body 20 contains a cylindrical opening therein. Sleeve 32 may be constructed with a media opening 34 to control the flow of media from media inlet 22 to media outlet 24. Media opening 34 may be constructed in any shape that controls the flow of media 140 from media inlet 22 to media outlet 24 as desired when valve 10 is open. For example, as illustrated in FIG. 5, media opening 34 may be irregularly shaped, or, more conventional, with a circular, elliptical, or other geometric shaped opening; alternatively it may only include a narrow opening. Preferably, as illustrated in FIGS. 4, and 6, media opening 34 includes a first portion 200 proximate to media outlet 24 and a second portion 202 distal to media outlet 24, second portion 202 being broader than first portion 200. This embodiment of media opening 34 facilitates metering particulate media when media valve 10 is in a partially open position.

In some embodiments, the flow control function of media opening 34 in sleeve 32 may be constructed directly into valve body 20. For example, valve body 20 may be constructed in a manner which is equivalent to sleeve 32 being fused to valve body 20. However, it is preferable to have a separate sleeve 32 because this allows relatively straight-forward modification of media opening 34, and, thus, the flow properties of media control valve 10, and because sleeve 32 may be subject to wear and may need periodic replacement.

Sleeve 32 may be formed out of any material that may be shaped as desired and provides sufficient durability. For example, sleeve 32 may be formed of a material that may maintain the shape of media opening 34 despite the passage of media 140 through media opening 34 over time. In some embodiments, sleeve 32 may be constructed of a metal, metal alloy or polymer. Preferably, sleeve 32, like plunger 30, is constructed of steel with tungsten carbide on the surfaces subject to the most wear, such as the inner, lower portion 35 of sleeve 32. Again, these materials are selected due to their abrasion resistance and dimensional stability. However, it should be understood that the preferred material of construction for sleeve 32 may vary with the media used and, in other embodiments, other materials may be preferred. For example, in some embodiments, it is preferred to form sleeve 32 from urethane because of its cost, serviceability and resistance to jamming with certain media, such as steel shot. Sleeve 32 may be constructed by any method that produces sleeve 32 having the desired shape and durability out of the material or materials of construction. For example, sleeve 32 may be constructed by sintering, casting or molding and polymerization of a prepolymer.

One or more seals 36 may be positioned between plunger 30 and valve body 20 to prevent media, fluid from the conduit or other contaminants from passing between valve body 20 and housing 40. In a preferred embodiment, three seals 36 are positioned between plunger 30 and valve body 20 to prevent contamination. Typically, the likelihood of contamination is much greater from valve body 20 to housing 40 than the reverse. Accordingly, seals 36 are typically oriented to face valve body 20. In some instances, such as where the pressure within housing 40 may exceed the pressure within valve body 20, one or more of seals 36 may be oriented to face housing 40. In such instances, it is preferred that seals 36 closest to housing 40 be faced toward housing 40. In one embodiment, several seals 36 are formed as a unitary structure. For example, three seals may be formed as a single solid piece of material.

Seals 36 may be formed out of any material that will provide an adequate seal with sufficient durability. For example, seals 36 may be formed of a resilient, pliable material, such as some polymers. The material may also be abrasion resistant and have a low coefficient of friction. In some instances, seals 36 may be constructed of an elastomer. Preferably, seals 36 are constructed of molythane because it is self-lubricating or urethane because of its abrasion resistance. Seals 36 may be constructed by any method that produces seals 36 having the desired seal and durability out of the material or materials of construction. For example, seals 36 may be constructed by molding and polymerization of a prepolymer.

Seat 26 may be constructed of any material or materials and in any manner that produces a solid connection with plunger 30 when media control valve 10 is in a closed position. For example, seat 26 may be constructed to fit snugly with plunger 30. In embodiments where plunger 30 is cylindrical, seat 26 may be a circular annulus. Seat 26 may be constructed of the same materials and using the same methods as seals 36.

Housing 40 may be constructed in any manner and of any material or materials that produce housing 40 that may be connected to valve body 20, house piston 42 and have sufficient durability. For example, housing 40 may be constructed to function as a cylinder for piston 42. Preferably, the inside of housing 40 is a uniform circular cylinder, however, this is not required as long as the inside of housing 40 connects with piston 42 to provide a seal. Housing 40 may be constructed such that piston 42 may travel within housing 40. Preferably piston 42 has sufficient range of motion to allow plunger 30 to move from a fully open position in which plunger 30 does not obstruct media opening 34 to a fully closed position in which plunger 30 rests against valve seat 26, completely obstructing flow through media opening 34. Piston 42 may effectively divide housing 40 into a drive chamber 44 and an exhaust chamber 46. Where housing 40 has a drive chamber 44, housing 40 may be constructed with a drive inlet 48 to drive chamber 44, allowing pressure to be applied to piston 42 to open media control valve 10.

Housing 40 may also include one or more vents 50 in exhaust chamber 46, allowing fluid to flow into and out of exhaust chamber 46 as the volume within exhaust chamber 46 varies with the motion of piston 42. Vents 50 may include filters 52 to prevent contaminants from entering housing 40 while still allowing vents 50 to perform their exhaust function. Preferably, filters 52 in vents 50 are capable of filtering particles larger than about 20 microns as this filters most particles, but does not restrict the flow of fluid through vents 50 enough to significantly affect performance of media control valve 10. Furthermore, particles less than about 20 microns may be able to fit between housing 40 and piston 42 and are less likely to damage piston 42 or cause piston seal 58 to fail. A suitable filter 52 may be constructed by sintering an appropriate material, such as a metal or metal alloy. Preferably the filter is constructed of sintered brass.

Housing 40 may be constructed to provide access to the inside of housing 40. For example, housing 40 may include a cap 66, which may be removed to provide access to the inside of housing 40. Cap 66 may be constructed in any manner that allows it to connect securely with housing 40 yet allows access to the inside of housing 40. For example, cap 66 may be constructed to cover the open top of housing 40, and may include structure allowing it to be connected to housing 40. In one embodiment, cap 66 and housing 40 may include matching holes, through which bolts 68 may be inserted to secure cap 66 to housing 40. Preferably, in order to insure a secure connection, four evenly spaced bolt holes 64 and bolts 68 are used to secure cap 66 to housing 40. Cap 66 may be constructed of the same materials and by the same method as housing 40.

Housing 40 may also be constructed to include structure to allow the adjustment of the operation of media valve 10. For example, housing 40 may enclose a spring 56 and attendant structure to adjust the tension on spring 56 and, thus, the operation of media control valve 10. Alternatively, housing 40 may include an air shock (not shown) and attendant structure. In one embodiment, spring 56 rests between piston 42 and cap 66, biasing piston 42 and plunger 30 toward media outlet 24 and thus biasing media control valve 10 into a closed position. The tension on spring 56 may be used to control how difficult it is to move piston 42, and thus, the amount of pressure required to actuate media control valve 10 or the degree of actuation for a given pressure. Structure to adjust the tension on spring 56 may include a spring retainer 80 that mates with housing 40. Where spring retainer 80 is used to allow the tension on spring 56 to be adjusted, a device for facilitating the adjustment of spring retainer 80, such as a knob 82, crank or other handle, may be used. An O-ring 84, or like seal, may be positioned between spring retainer 80 and housing 40, to prevent the ingress of contaminants into housing 40. Media control valve 10 may include a metering indicator. For example, spring retainer 80 may include marking corresponding to the degree to which media control valve 10 is open.

Housing 40 may be constructed of any material or materials that may be shaped in the desired configuration and has sufficient durability to provide long life. For example, housing 40 may be constructed of the same materials as valve body 20. Similarly, housing 40 may be constructed using the methods discussed with respect to valve body 20.

Piston 42 may be constructed in any manner and using any materials that allow it to fit snugly within housing 40 and to connect with plunger 30 such that plunger 30 is moved with the motion of piston 42. For example, piston 42 may relatively flat and shaped to match the cross-section of housing 40. Typically, piston 42 will be circular to match the circular cross-section of cylindrical housing 40. Piston 42 may be constructed with structure to connect it to plunger 30. For example, where plunger 30 includes a threaded region, piston 42 may have a hole therein through which a portion of plunger 30 is inserted, and nut 70 threaded onto, to attach piston 42 to plunger 30.

Piston 42 may be constructed with structure to insure that fluid, media, contaminants and other materials are prevented from passing between drive chamber 44 and exhaust chamber 46 of housing 40. For example, piston 42 may be constructed with one or more retainers adapted to maintain a piston seal 58 in place around piston 42.

Piston 42 may be constructed to reduce the adverse effect of media and other contaminants that find their way into drive chamber 44. For example, piston 42 may include a contaminant isolation region 48 where contaminants are collected and isolated from more sensitive areas of media control valve 40, such as the walls of housing 40 and piston seal 58. In one embodiment, contaminant isolation region 48 includes a recess in piston 42. In this embodiment, piston 42 may have an overall dish shape, allowing contaminants to settle into the dish.

Piston 42 may be constructed of any material or materials that provide sufficient rigidity and durability. For example, piston 42 may be constructed of a metal, metal alloy or polymer. Preferably, piston 42 is constructed of aluminum because of its relatively high strength and relatively low cost and weight. More preferably, piston 42 is constructed of 356 T6 aluminum. Piston 42 may be hard-coat anodized. Piston 42 may be constructed by any method that produces piston 42 from the desired material or materials of construction, such as casting, machining or molding.

In some embodiments, structure to prevent piston 42 from impacting against housing 40 or cap 66 may be included in media control valve 10. For example, structure may be positioned within housing 40 to absorb the impact of piston 42 striking housing 40 or cap 66. In one embodiment, this structure may comprise a bumper, such as bump ring 86, capable of absorbing the impact of piston 42 striking it. Bump ring 86 may be constructed in any manner and of any material or materials that allow it to intercept piston 42 and to dissipate some of its impact energy. For example, bump ring 86 may be constructed as an elastomeric ring and made by a method suitable to the material. Preferably, bump ring 86 is constructed from neoprene because of its impact absorbing ability.

While a conventional piston is described by way of example herein, it should be understood that piston 42 may also be constructed as a diaphragm. Where piston 42 is constructed as a diaphragm, it may be constructed such that it is connected at its edges to housing 40, but is free to move in a central portion connected to plunger 30. For example, piston 42 may be constructed of a flexible material, which may be an elastomer. Such material may be selected based on its degree of flexibility and its ability to withstand repeated flexing over an extended period of operation of media control valve 10.

In some instances, media control valve 10 may be subject to significant vibration, for example, due to a mechanical agitator operated to improve media flow. Vibration is undesirable because it may, for example, result in a change in metering position. Accordingly, it may be desired to add structure to media control valve 10 that dampens vibration. For example, a structure capable of absorbing vibrational energy or adding friction to prevent parts from vibrating apart may be included in media control valve 10. In one embodiment, a vibration disc 88 is positioned between spring 56 and spring retainer 80 to create friction and prevent slipping of spring retainer 80, potentially resulting in a loss of metering position. Vibration disc 88 may be constructed in any manner and of any material or materials that allow it create friction between two parts. However, vibration disc 88 should not create so much friction that it prevents adjustment or detachment of the parts. For example, vibration disc 88 may be circular, polygonal or of any other shape and may be formed of any material having a relatively high coefficient of friction. Typically, vibration disc 88 is formed of a polymeric material. Preferably, vibration disc 88 is constructed of polyurethane because it may create friction without preventing adjustment.

Base 60 may be constructed in any manner and of any materials that allow communication between media outlet 24 and fluid passage 62. For example, base 60 may be adapted to be attached to valve body 20 and conduit 110, such that fluid passage 62 is in communication with both media outlet 24 and conduit 110. Typically, an opening in base 60 is placed in communication with media outlet 24, allowing media to pass into fluid passage 62. Where base 60 is in communication with media outlet 24, it is preferred that the opening between base 60 and media outlet 24 not impede the flow of media into fluid passage 62 or the ability of plunger 30 to close media control valve 10. For example, the opening between media outlet 24 and gas passage 62 may be larger than media opening 34 in sleeve 32, ensuring that it is not the flow-limiting restriction and allowing media to disperse, making it easier for plunger 30 to move the media aside as it closes.

Base 60 may be constructed with structure allowing it to be connected to valve body 20. The structure allowing base 60 to be attached to valve body 20 may be integrally formed with base 60, allowing base 60 to be unitary structure. This embodiment is in contrast to typical media control valve bases wherein the base consists of several pieces, such as a separate fluid passage 62 and attachment structure for attaching fluid passage 62 to valve body 20.

In one embodiment, base 60 may include bolt holes 64 through which bolts 68 may be passed to connect base 60 to valve body 20. Preferably, bolt holes 64 extend not only through base 60 but also through valve body 20 and into housing 40. Where bolt holes 64 extend through base 60 and valve body 20 into housing 40, removing bolts 68 allows media control valve 10 to be quickly disassembled for inspection, modification or maintenance. For example, bolts 68 may be removed to allow access to and replacement of sleeve 32, such that sleeve 32 may be replaced with an alternate sleeve 32 having a different media opening 34. As another example, bolts 68 may be removed to provide access to seals 36 for routine maintenance and repair. Preferably, base 60, valve body 20 and housing 40 each include four corresponding bolt holes evenly distributed about such structures to provide a secure connection therebetween. Housing 40 and valve body 20 may include further mating structure that facilitates the attachment of housing 40 and body 20. For example, one of housing 40 and valve body 20 may include a grove or protrusion that mates with a corresponding groove or protrusion in the other one of housing 40 and valve body 20.

Base 60 may be constructed of any material that may be shaped in the desired configuration and has sufficient durability to provide long life. For example, base 40 may be constructed of various metals or metal alloys. In a preferred embodiment, base 60 is constructed of carbon steel, such as 4140 carbon steel, because of its strength, cost, and ability to be hardened and cast. Where base 60 is constructed of carbon steel, it may be heat treated, for example, to approximately 55 Rockwell C, and may be phosphate coated to inhibit rusting. Base 40 may be constructed using the methods discussed with respect to valve body 20.

In some embodiments, fluid passage 62 may be subject to mechanical or chemical damage. Accordingly, structure may be added to fluid passage 62 to resist such damage. For example, a flow sleeve (not shown) may be positioned within fluid passage 62. The flow sleeve may be constructed of any material that is sufficiently chemically and/or mechanically resistant. For example, the flow sleeve may be constructed of polyurethane by conventional techniques.

Having thus described certain embodiments of the present invention, various alterations, modifications and improvements will be apparent to those of ordinary skill in the art. Such alterations, variations and improvements are intended to be within the spirit and scope of the present invention. Accordingly, the foregoing description is by way of example and is not intended to be limiting. The present invention is limited only as defined in the following claims and the equivalents thereto.

What is claimed is:

1. A media control valve, comprising:
    a valve body having a media inlet and a media outlet;
    a plunger positioned within the valve body;
    a sleeve positioned within the valve body;
    a media opening in the sleeve adapted to receive a particulate media and having a first portion proximate to the media outlet and a second portion distal to the media outlet, wherein the second portion is broader than the first portion;
    a housing connected to the valve body;
    a piston positioned within the housing and connected to the plunger; and
    a base connected to the valve body in communication with the media outlet, wherein the plunger is constructed and arranged to be movable by the piston with respect to the media opening to provide all metering positions from a fully closed position to a fully open position.

2. The valve of claim 1, wherein the base comprises a unitary structure including a fluid passage and an attachment mechanism adapted to attach the base to the valve body.

3. The valve of claim 1, wherein the piston comprises a contaminant isolation region.

4. The valve of claim 3, wherein the piston is convex in the direction of the valve body.

5. The valve of claim 1, further comprising at least one seal positioned between the plunger and the valve body adapted to resist the passage of one of media, fluid, contaminants, and combinations thereof between the valve body and the housing.

6. The valve of claim 5, comprising three seals between the plunger and the valve body.

7. The valve of claim 6, wherein the three seals are constructed as a unitary piece.

8. The valve of claim 1, wherein the housing comprises an exhaust chamber including a vent.

9. The valve of claim 8, wherein the vent comprises a filter.

10. The valve of claim 9, wherein the filter is adapted to filter particles greater than about 20 microns in diameter.

11. The valve of claim 1, wherein the valve body and the housing comprise two distinct structures adapted to be joined together.

12. The valve of claim 11, wherein the valve body and housing comprise a mating structure.

13. The valve of claim 1, further comprising a spring within the housing and a spring retainer.

14. A media control valve, comprising:
    a valve body having a media inlet and a media outlet;
    a plunger positioned within the valve body;
    a sleeve positioned within the valve body;
    a media opening in the sleeve adapted to receive a particulate media;
    a housing connected to the valve body;
    a piston having a contaminant isolation region positioned within the housing and connected to the plunger, the contaminant isolation region being sized and adapted to isolate contaminant collected therein from the housing; and a base connected to the valve body in communication with the media outlet;

wherein the plunger is constructed and arranged to be movable by the piston with respect to the media opening to provide all metering positions from a fully closed position to a fully open position.

15. The valve of claim 14, wherein the base comprises a unitary structure including a fluid passage and an attachment mechanism adapted to attach the base to the valve body.

16. The valve of claim 14, wherein the media opening comprises a first portion proximate to the media outlet and a second portion distal to the media outlet and wherein the second potion is broader than the first portion.

17. The valve of claim 14, wherein the piston is convex in the direction of the valve body.

18. The valve of claim 14, further comprising at least one seal between the plunger and the valve body adapted to resist the passage of one of media, fluid, contaminants, and combinations thereof between the valve body and the housing.

19. The valve of claim 18, comprising three seals positioned between the plunger and the valve body.

20. The valve of claim 19, wherein the three seals are constructed as a unitary piece.

21. The valve of claim 14, wherein the housing comprises an exhaust chamber including a vent.

22. The valve of claim 21, wherein the vent comprises a filter.

23. The valve of claim 22, wherein the filter is adapted to filter particles greater than about 20 microns in diameter.

24. The valve of claim 14, wherein the valve body and the housing comprise two distinct structures adapted to be joined together.

25. The valve of claim 24, wherein the valve body and housing comprise a mating structure.

26. The valve of claim 14, further comprising a spring within the housing and a spring retainer.

* * * * *